United States Patent [19]

Little et al.

[11] Patent Number: 4,669,059
[45] Date of Patent: May 26, 1987

[54] METHOD AND APPARATUS IN A DATA PROCESSOR FOR SELECTIVELY DISABLING A POWER-DOWN INSTRUCTION

[75] Inventors: Wendell L. Little; Kenneth R. Burch, both of Austin, Tex.

[73] Assignee: Motorola, Inc., Schaumburg, Ill.

[21] Appl. No.: 549,956

[22] Filed: Nov. 7, 1983

[51] Int. Cl.$^4$ ............................................... G06F 9/00
[52] U.S. Cl. ................................................... 364/900
[58] Field of Search ................ 364/200, 900; 331/111; 365/772, 189

[56] References Cited

U.S. PATENT DOCUMENTS

| | | | |
|---|---|---|---|
| 3,858,182 | 12/1974 | Delagi et al. | 364/200 |
| 4,125,867 | 11/1978 | Cochran | 364/772 |
| 4,245,308 | 1/1981 | Hirschman | 364/200 |
| 4,290,116 | 9/1981 | Morse | 364/900 |
| 4,316,247 | 2/1982 | Iwamoto | 364/200 |
| 4,317,181 | 2/1982 | Teza et al. | 364/900 |
| 4,409,665 | 10/1983 | Tubbs | 364/900 |
| 4,463,440 | 7/1984 | Nishiura et al. | 364/900 |
| 4,573,117 | 2/1986 | Boney | 364/200 |
| 4,580,246 | 4/1986 | Sibigtroth | 365/189 |

OTHER PUBLICATIONS

Motorola: Single Chip Microcomputer Data, 2nd Printing, Motorola, Inc., 1984 pp. 3-891 to 3-894.

Primary Examiner—Gareth D. Shaw
Assistant Examiner—John G. Mills
Attorney, Agent, or Firm—John A. Fisher; Jeffrey Van Myers

[57] ABSTRACT

A method for allowing the user of a data processor having a power-down instruction to selectively disable the power-down instruction. In the preferred circuit, the user stores a special code in a control register indicating that the power-down instruction is to be disabled. Upon a power-down instruction being subsequently executed, the processor is precluded by the code from turning off the oscillator which provides the system clocks. The method and circuit allows the code to be stored in the control register once and only once between system resets.

5 Claims, 4 Drawing Figures

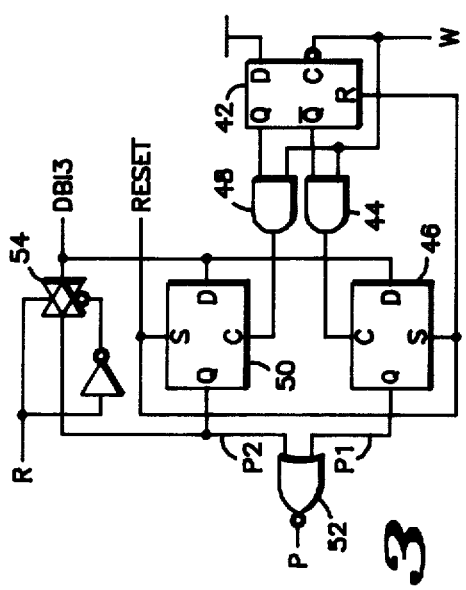
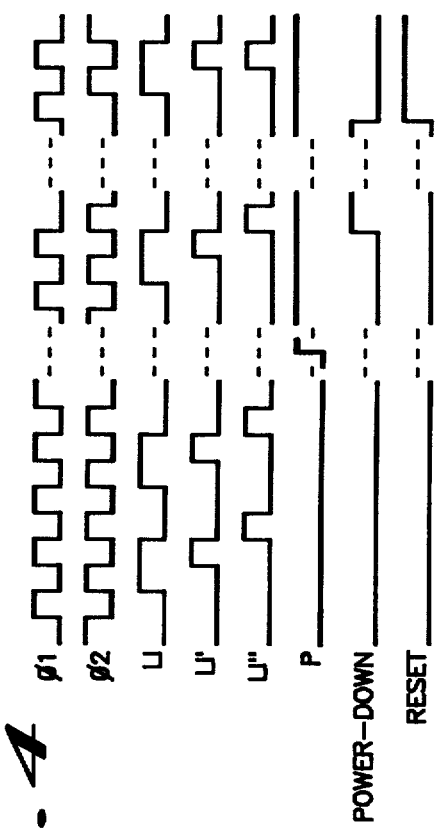
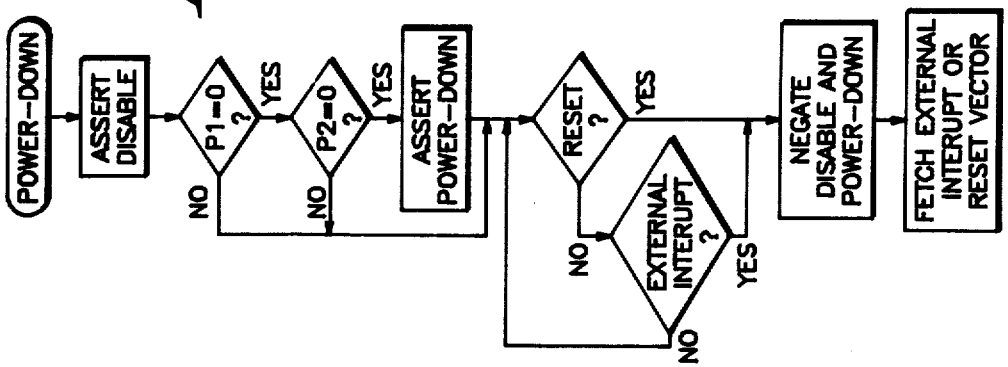
FIG. 1
FIG. 3
FIG. 4

4,669,059

METHOD AND APPARATUS IN A DATA PROCESSOR FOR SELECTIVELY DISABLING A POWER-DOWN INSTRUCTION

CROSS REFERENCE TO RELATED APPLICATIONS

Related subject matter is contained in U.S. Pat. No. 4,573,117, filed simultaneously herewith copending Application Ser. No. 065,292 and 065,293 all and assigned to the same assignee.

TECHNICAL FIELD

The present invention relates generally to data processors, and, more particularly, to a method and circuit in a data processor for selectively disabling a power-down instruction.

BACKGROUND ART

In data processing systems capable of simultaneously supporting more than one user, no user-accessible mechanism is provided for powering down the processor under program control. Thus, for example, in such main frame type processors as the Digital Equipment Corporation's PDP 11/70 and the International Business Machine's System 370, no power-down instruction is provided.

Even in those systems capable of supporting only a single user, the dynamic nature of the circuitry typically used in the processor prevents the implementation of a power-down instruction. Typical of such systems are those in which the processor is a single-chip microprocessor fabricated using exclusively N-channel MOS transistors, such as the Intel 8080 or Motorola's 6800. Since the logic in these types of microprocessors is primarily dynamic rather than static, the "current" state information and the "data" stored in the processor's registers would be lost in the event of a power-down.

As MOS technology advanced to the point where large-scale integration became feasible using complementary P-channel and N-channel MOS transistors, it became possible to fabricate a microprocessor using static logic. With the introduction of Motorola's first single-chip CMOS microprocessor, the MC146805E2, the user was first given the capability to power-down the processor under program control. In this processor, the user was even given the choice of two distinct power-down levels. For example, using a "WAIT" instruction, the user could greatly reduce operating power by disabling the clock outputs provided by the on-chip oscillator while allowing the oscillator to continue operating. In contrast, using a "STOP" instruction, the user could disable the oscillator itself to save maximum operating power. In either event, the clocks/oscillator would be reenabled to restart the processor in response to either a manually generated reset signal or a peripheral generated interrupt signal. (See, copending application Ser. Nos 065,292 and 065,293.)

Although the availability of these power-down instructions was widely accepted among users and often copied by other microprocessor manufacturers, those applications requiring very high reliability had to be very carefully designed and rigorously tested to assure that the STOP instruction in particular could not be inadvertently executed in the event of a program error condition. However, it has been possible, using good programming practices and thorough debugging and testing, to utilize this type of microprocessor even in such demanding applications as heart pacemakers and other intrusive medical environments. On the other hand, the user's risks could be further reduced if some heretofore unavailable mechanism were provided to disable, either absolutely or selectively, such power-down instructions.

In U.S. Pat. No. 4,573,117, a method is taught for enabling the user of such a data processor to selectively disable the power-down instruction under program control. According to a circuit taught therein, the user stored a control code in a control register using a special instruction. As long as the code is present in the control register, the circuit prevents the data processor from disabling the oscillator. However, this method and circuit may be less than satisfactory in some high-security applications since there is no way for preventing the control code from being later cleared out of the control register. Thus, an errant program may still be able to reenable the power-down instruction and then power-down the processor.

SUMMARY OF THE INVENTION

Accordingly, it is an object of the present invention to provide a method and a circuit for use in a data processor having a power-down instruction to disable that power-down instruction.

Another object of the present invention is to provide a method and a circuit for use in a data processor having a power-down instruction for selectively disabling that power-down instruction.

Yet another object of the present invention is to provide a method and a circuit which allows the user of a data processor having a power-down instruction to selectively disable that power-down instruction under program control.

Still another object of the present invention is to provide a method and circuit which allows the user of a data processor having a power-down instruction to selectively disable that power-down instruction from powering-down the entire processor.

One other object of the present invention is to provide a method and circuit which allows the user of a data processor having a power-down instruction two levels of program control for selectively disabling that power-down instruction.

These and other objects and advantages of the present invention are achieved in a data processor comprising: an oscillator which provides a periodic clock signal except in response to receiving a power-down signal; reset logic which provides a reset signal in response to a predetermined condition; and instruction execution control logic, operative in synchronism with the clock signal, which receives each of a plurality of different instructions comprising an instruction stream, the instruction execution control logic providing a store enable signal in response to receiving a predetermined store instruction in the instruction stream, and, in response to receiving a predetermined power-down instruction in the instruction stream, providing the power-down signal to the oscillator until the reset means next provides the reset signal, and then proceeding to a next instruction in the instruction stream only upon resumption of the clock signal. According to the present invention, the processor includes a circuit for selectively disabling the power-down instruction, comprising: a control register which stores in response to a store signal a predetermined control code having a selected one of first and second values; a latch which assumes a first state in response to the reset signal and a second state in response to the termination of the store enable signal; interlock logic which provides the store signal to the control register in response to the instruction execution control logic providing the store enable signal while the latch is in the first state; and a gate which responds to the control code in the control register having the first value by preventing the instruction execution control logic from providing the power-down signal to the oscillator in response to the power-down instruction.

BRIEF DESCRIPTION OF THE DRAWINGS

FIG. 1 is a flow diagram which illustrates the preferred method for selectively disabling a power-down instruction in accordance with the present invention.

FIG. 3 is a preferred circuit for implementing the "P" bits in the system control register in FIG. 2.

FIG. 4 is a timing diagram useful in understanding the operation of the circuit of FIGS. 2 and 3.

DESCRIPTION OF THE INVENTION

Figure 2:
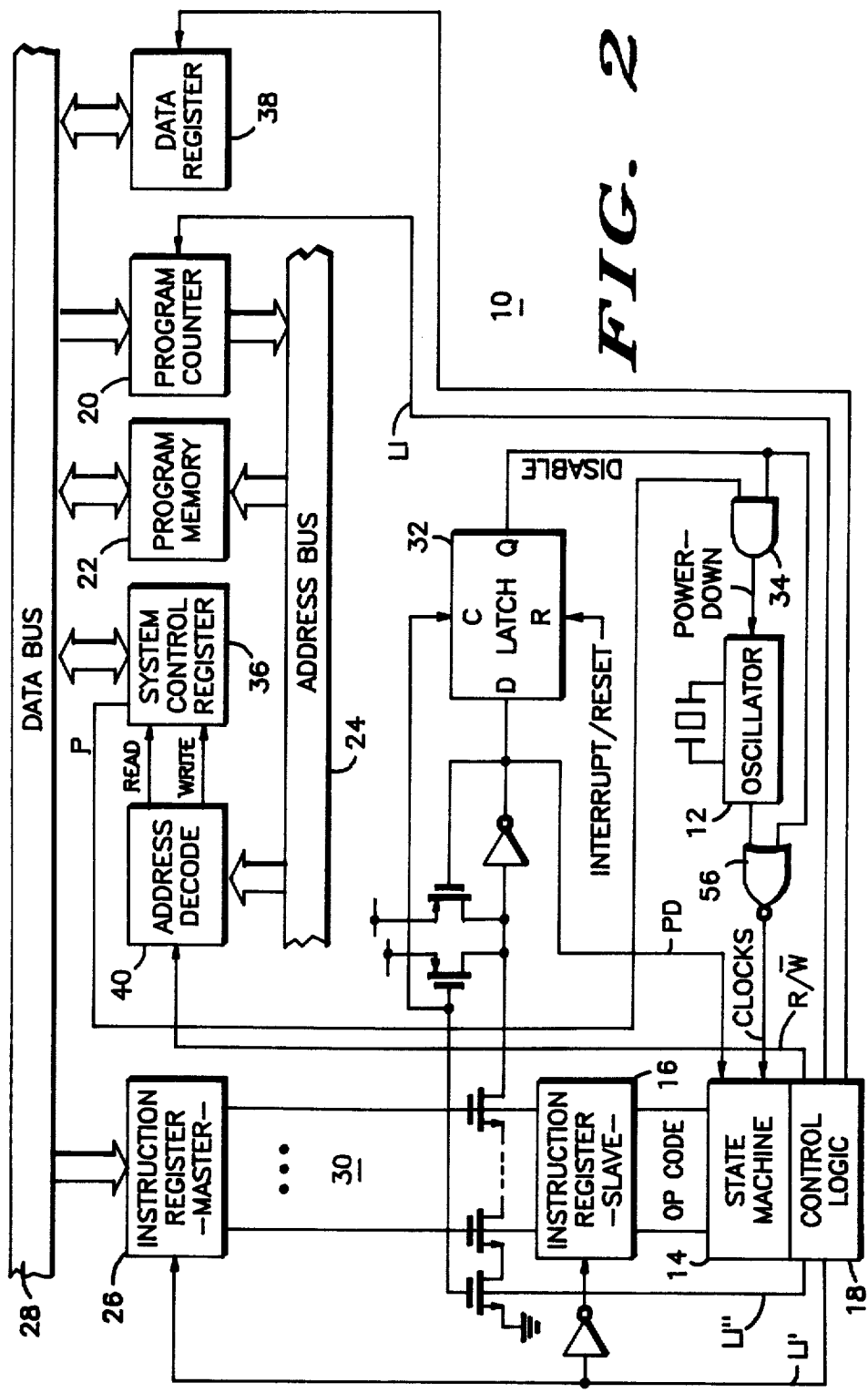
FIG. 2 is a preferred circuit for implementing the method shown in FIG. 1 in a CMOS microprocessor.

In a conventional data processor having a power-down instruction, upon any such power-down instruction being loaded into the processor for execution, a power-down signal will be asserted to power-down the processor. Typically, the power-down signal will disable the oscillator responsible for providing the system clocks. Without clocks to control instruction execution sequencing, the processor will remain in the same state present at the time the power-down signal was asserted. However, certain portions of the processor, such as the master reset circuitry and, in most cases, the peripheral interface circuitry responsible for monitoring interrupt signals from external resources, will still respond to the respective conditions. Upon the occurance of any of these special events, the power-down signal will be negated to enable the oscillator to again provide the system clocks. At the appropriate point in the renewed clock sequence, the next instruction is loaded into the processor for execution.

In the preferred method shown in FIG. 1, the instruction execution control sequence for the power-down instruction has been modified so that the processor asserts a disable signal to decouple the clocks from the processor immediately after the power-down instruction is loaded into the processor for execution. If both a "P1" bit and a "P2" bit are determined to be in a particular state, say "clear", then a power-down signal is also asserted to actually power-down the oscillator. On the other hand, if either P bit is "set", then the power-down signal will remain negated. Thus, the power-down instruction can be disabled by taking whatever steps may be required to "set" one of the P bits.

While various mechanisms for "setting" the P bits will readily occur to those skilled in the art, most such techniques will simply be variations on a few basic designs. For example, if the user desires that the power-down instruction be permanently disabled, then the manufacturer may fabricate the microprocessor with the P bit permanently set, such as by selecting an appropriate mask option before fabrication. On the other hand, if the user desires the option to utilize the same microprocessor in differing applications, one requiring the power-down instruction and another demanding the absence of the power-down instruction, then a user-accessible mechanism for "setting" the P bit may be provided. For example, a permanent mechanism may be realized by implementing the P bit as an externally actuated fuseable link or as a programmable read-only memory cell, while a semi-permanent mechanism may be provided by using one of the several types of modifiable read-only memories such as EPROM or EEPROM. However, none of these techniques are suitable when the user's application is such that the power-down instruction is desired while the processor is operating in one mode but unacceptably dangerous while the processor is operating in another mode. In some of these applications, the program selectable form taught in U.S. Pat. No. 4,573,117 may be sufficient. However, if very high security is also required, then the present method may be more satisfactory.

Shown in FIG. 2 are relevant portions of a data processor 10 having a power-down instruction which may be selectively disabled under program control. In the illustrated form, an oscillator 12 provides periodic system clocks (01 and 02 in FIG. 4) to each of the several operating components of the processor 10. A state machine 14, operating generally in synchronism with the clocks, responds in a conventional manner to each instruction opcode loaded into a slave portion 16 of an instruction register. In general, the state machine 14 coordinates and sequences the operation of the processor 10 using control logic 18, so that all of the timing and control signals appropriate for the particular instruction are generated at the proper time. At the end of each instruction execution sequence, state machine 14/control logic 18 provides a load instruction (LI) signal to enable a program counter 20 to provide to a memory 22 via an address bus 24 the address of the next instruction in the instruction stream. After a 02 delay, state machine 14/control logic 18 provides an instruction register control signal LI' to enable a master portion 26 of the instruction register to load the next instruction which has just been provided by the memory 22 on a data bus 28. On the following 01, state machine 14/control logic 18 provides an instruction decoder control signal LI" to enable an instruction decoder 30 to decode the new instruction. At substantially the same time, state machine 14/control logic 18 negates the control signal LI' thereby enabling the slave portion 16 to load the next instruction. Using the output from decoder 30 to select the initial state appropriate for the new instruction, state machine 14 then begins executing the new instruction.

Assume now that the illustrated portion of instruction decoder 30 signals that the instruction just loaded into the master portion 26 is the power-down instruction by asserting a power-down (PD) signal to state machine 14. Simultaneously, the LI" signal enables a latch 32 to latch the state of the power-down signal. Since the PD signal will be asserted, latch 32 will assert a disable (DISABLE) signal. In a conventional processor 10, the DISABLE signal would be coupled directly to oscillator 12, thereby terminating the clocks. Only upon receiving either a RESET or INTERRUPT signal would latch 32 be reset. Once latch 32 resets and negates the DISABLE signal, oscillator 12 will again provide the clocks.

In the preferred embodiment, however, an AND gate 34 is interposed between latch 32 and oscillator 12 to prevent the DISABLE signal from reaching oscillator 12 if the state of a power-down bit "P" in a system control register 36 is "set". Thus, the power-down instruction may be selectively disabled by the user simply by loading a binary one (1) into the "P" bit position of system condition register 36. In the illustrated form, this is accomplished by loading a suitable binary bit pattern into an available data register 38, such as an accumulator, using conventional instructions. Immediately thereafter, a conventional store instruction which specifies data register 38 as the operand source and the address of the system control register 36 as the operand destination must be executed. Upon receiving this store instruction, state machine 16/control logic 18 will enable the program counter 20 to capture the destination address of the store instruction as it is provided by program memory 22 on data bus 28, and then to provide this address on address bus 24. State machine 14/control logic 18 will then provide a control signal to enable data register 38 to provide the desired bit pattern on data bus 28. In response to the address on address bus 24 and a read/write (R/W) signal provided by state machine 14/control logic 18 to indicate that the operand bit pattern on data bus 28 is to be stored, address decoder 40 will provide a write (W) signal to enable system control register 36 to store the desired bit pattern. Since the odds that these two instructions will be executed sequentially by an errant program are very small, this mechanism provides significant protection against inadvertant power-down for most applications.

Using the preferred form of circuit shown in FIG. 3 for implementing the P bit in system control register 36, however, provides even greater protection against inadvertant power-down of the processor 10. In the illustrated form, a latch 42 will be reset to the clear state each time the reset signal is received, thus enabling an AND gate 44 to clock a "P1" bit value on the respective line (DB) of the data bus 28 into a half-latch 46 in response to the W signal provided by the address decode 40. Upon the termination of the W signal, latch 42 will be set to the set state, thereby disabling gate 44 and enabling an AND gate 48 to clock a "P2" bit value on DB into a half-latch 50 in response to subsequent W signals. If either P1 or P2 is a binary one (1), a NOR gate 52 will be disabled from asserting the P signal to gate 34. A transmission gate 54 allows the P2 bit to be read in response to the R signal provided by address decoder 40. Preferrably, both of the latches 46 and 50 are set to the set state and latch 42 is reset to the clear state in response to the reset signal.

This preferred interlock mechanism thus allows half-latch 46 to be written to once and only once between system resets, while allowing half-latch 50 to be written to only after half-latch 46 has been written to. Depending upon the requirements of the particular application, the user may choose to fix P1 in the set state by writing a binary one (1) into half-latch 46 as soon as possible after coming out of reset, for maximum security against inadvertant power-down. On the other hand, the user may decide to clear P1 by writing a binary zero (0) to half-latch 46, and thereafter selectively disable the power-down instruction when required by writing a binary one (1) into half-latch 50 to set P2.

One further improvement of the present method and circuit over that taught in copending application number (SC-05011A) is the provision of a NOR gate 56 between the oscillator 12 and state machine 14/control logic 18 so that the latter will actually be powered-down in response to the power-down instruction, even though other components of the data processor 10, such as a dead-man timer (not shown), will continue to be supplied with clocks.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. In a data processor having:

oscillator means for providing a periodic clock signal except in response to receiving a power-down signal;

reset means for providing a reset signal in response to a predetermined condition;

instruction execution control means, operative in synchronism with said clock signal, for receiving each of a plurality of different instructions comprising an instruction stream, for providing a store enable signal in response to receiving a predetermined store instruction in said instruction stream, and, in response to receiving a predetermined power-down instruction in said instruction stream, providing said power-down signal to said oscillator until said reset means next provides said reset signal, said instruction execution control means proceeding to a next instruction in said instruction stream only upon resumption of said clock signal;

a circuit for selectively disabling said power-down instruction, comprising:

first control register means for storing in response to a first store signal a first predetermined control code having a selected one of first and second values;

second control register means for storing in response to a second store signal a second predetermined control code having a selected one of said first and second values;

latch means for assuming a first state in response to said reset signal and a second state in response to the termination of said store enable signal;

interlock logic means for providing said first store signal to said first control register means in response to said instruction execution control means providing said store enable signal while said latch means are in said first state, and for providing said second store signal to said second control register means in response to said instruction execution control means providing said store enable signal while said latch means are in said second state; and gate means responsive to either of said first and second control codes in said first and second control register means, respectively, having said first value, for preventing said instruction execution control means from providing said power-down signal to said osillator in response to said power-down instruction.

2. The data processor of claim 1 wherein said instruction execution control means includes latch means for asserting a disable signal in response to said instruction execution control means receiving said power-down instruction, and for negating said disable signal in response to said reset signal; and wherein said gate means provides said power-down signal to said oscillator in response to the assertion of said disable signal, but only if said predetermined control code in said control register has said first value.

3. The data processor of claim 2 wherein said gate means also decouple said clock signal from said instruction execution control means in response to said disable signal.

4. The data processor of claim 1 wherein said control register means store said first value as said control code in response to said reset signal.

5. In a data processor having:
  oscillator means for providing a periodic clock signal except in response to receiving a power-down signal;
  reset means for providing a reset signal in response to a predetermined condition;
  instruction execution control means, operative in synchronism with said clock signal, for receiving each of a plurality of different instructions comprising an instruction stream, for providing a store enable signal in response to receiving a predetermined store instruction in said instruction stream, and, in response to receiving a predetermined power-down instruction in said instruction stream, providing said power-down signal to said oscillator until said reset means next provides said reset signal, said instruction execution control means proceeding to a next instruction in said instruction stream only upon resumption of said clock signal;
  a method for selectively disabling said power-down instruction, comprising:
    storing in response to a first store signal a first predetermined control code having a selected one of first and second values;
    storing in response to a second store signal a second predetermined control code having a selected one of said first and second values;
    providing an interlock control signal in a first state in response to said reset signal and in a second state in response to the termination of said store enable signal;
    providing said first store signal in response to said instruction execution control means providing said store enable signal while said interlock control signal is in said first state, and providing said second store signal in response to said instruction execution control means providing said store enable signal while said interlock control signal is in said second state; and
    in response to either of said first and second control codes having said first value, preventing said instruction execution control means from providing said power-down signal to said oscillator in response to said power-down instruction.

* * * * *